United States Patent [19]
Flynn

[11] Patent Number: 5,790,829
[45] Date of Patent: Aug. 4, 1998

[54] EVENT SYNCHRONIZATION MECHANISM

[75] Inventor: Martin D. Flynn, Menlo Park, Calif.

[73] Assignee: Sun Microsystems, Inc., Palo Alto, Calif.

[21] Appl. No.: 675,633

[22] Filed: Jul. 1, 1996

[51] Int. Cl.$^6$ .................................................. G06F 9/00
[52] U.S. Cl. ........................ 395/500; 395/183.15; 364/578
[58] Field of Search ............................ 395/500, 183.15; 364/578

[56] References Cited

U.S. PATENT DOCUMENTS

| | | | |
|---|---|---|---|
| 5,542,069 | 7/1996 | Meppelink et al. | 395/500 |
| 5,566,337 | 10/1996 | Szymanski et al. | 395/733 |
| 5,576,734 | 11/1996 | Daniele et al. | 345/168 |
| 5,600,789 | 2/1997 | Parker et al. | 395/183.14 |
| 5,640,537 | 6/1997 | Jessen et al. | 395/500 |

*Primary Examiner*—Kevin J. Teska
*Assistant Examiner*—A. S. Roberts
*Attorney, Agent, or Firm*—Beyer & Weaver, LLP

[57] ABSTRACT

A computer process determines that processing by a resource manager of all previously sent event structures has been completed by sending a tag event structure after having sent the previously sent event structures and waiting for the tag event structure to be returned to the computer process by the resource manager. Since the resource manager processes all received event structures on a first-in-first-out basis, the tag event is only returned to the computer process once all previously sent event structures have been processed by the resource manager. The tag event structure is an event structure which is a custom event type and which includes data which identifies the tag event structure as such. Accordingly, the computer process recognizes the tag event structure as such when the tag event structure is received from the resource manager. A family of multiple events represent a complex action and simulation of other events is suppressed until simulation of each element event of the family of events is simulated. Simulation of a family of events is represented in a state and simulation of any event first checks the state to verify that simulation of no family of events is in progress. Such verification triggers simulation of the next event of the family of events. Simulation of the last event of the family of events changes the state to indicate that no family of events is currently being simulated. Since simulation of events other than those of the family of events is suppressed, event structures representing each event of the event family can be created individually as each event of the family of events is simulated. The use of tag events to synchronize processing of families of events enables effective synchronization of simulation of the events of the family.

39 Claims, 8 Drawing Sheets

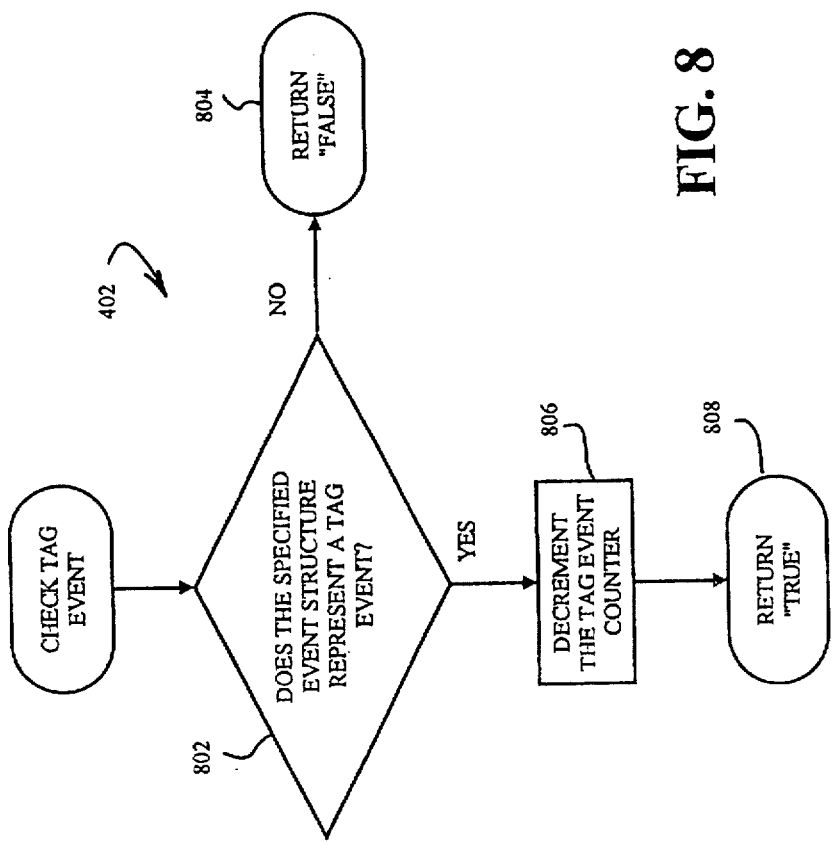
FIG. 8
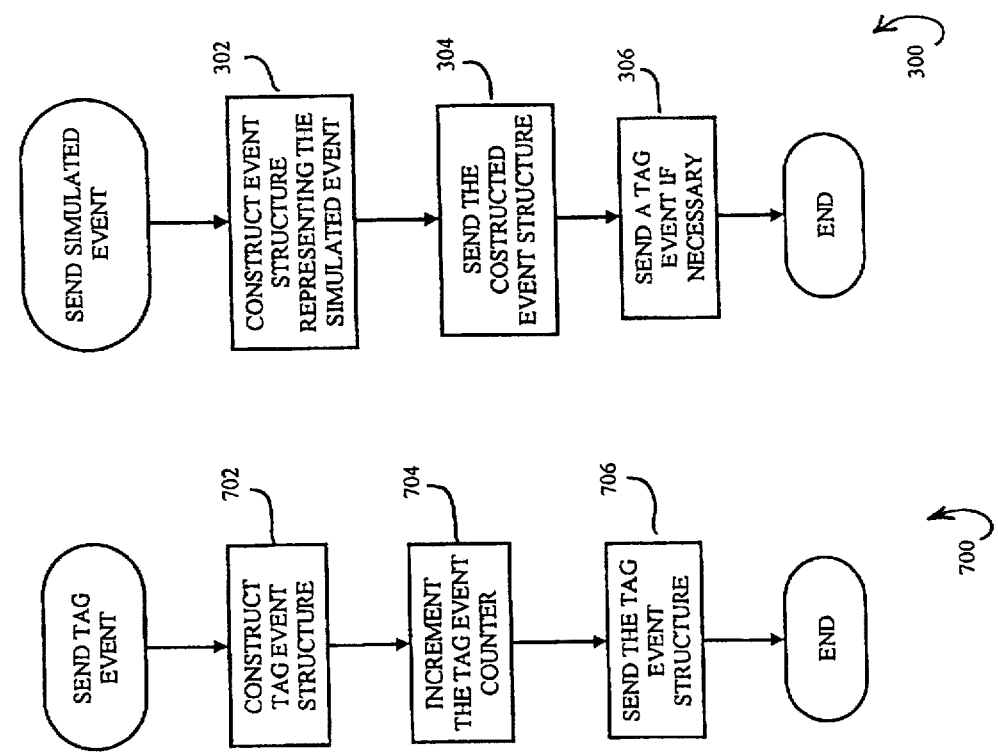
FIG. 3
FIG. 7

EVENT SYNCHRONIZATION MECHANISM

FIELD OF THE INVENTION

The present invention relates to computer simulation of events received and processed by a computer resource manager and, in particular, to a method and apparatus for synchronizing simulated events sent to the computer resource manager.

BACKGROUND OF THE INVENTION

It is sometimes desirable to generate and send to a resource manager simulated events. A brief description of events is provided to facilitate appreciation of the utility of simulated events. A resource manager is a computer process which is generally part of an operating system of a computer system and which detects and processes events, particularly events associated with input devices of the computer system. Generally, an event is an occurrence which must take place before a process or function is allowed to execute. Examples of events associated with user input devices include pressing or release of a key of a keyboard, movement of a pointing device such as an electronic mouse or trackball, and pressing or release of a button of such a pointing device. Each event associated with a particular device causes a device driver associated with the device to generate an event structure, which represents the events, and to send the event structure to the resource manager. Sending an event structure to the resource manager generally results in the inclusion of the event structure in an event input queue of the resource manager.

In processing the event, the resource manager determines to which of a number of computer processes executing within the computer system the event pertains and transfers the corresponding event structure to that computer process. The resource manager can determine to which of a number of computer processes an event pertains according to the nature of the event. For example, events associated with a keyboard generally pertain to a computer process which the resource manager determines to be active. An event associated with a pointing device pertains to the computer process corresponding to the particular point on a computer display device corresponding to a current cursor position at the time of the event. One illustrative example of such a resource manager is the Xserver process which manages the graphical user interface of the X Windows communication protocol of the UNIX operating system. In most graphical user interfaces, a computer display device is partitioned into rectangular areas commonly known as windows, which may overlap one another and each of which is associated with a computer process executing within the computer system. When an event structure representing an event associated with a pointing device is received by the resource manager, the resource manager typically determines in which window the cursor is currently displayed and sends the event structure to the computer process with which that window is associated. As a result, the resource manager enables a user to interact with any of the computer processes associated with a window of the computer display device.

A computer process can generate event structures representing simulated events for generally one of two reasons. Such event structures can be generated and sent by a computer process to simulate a complex operation which has been preprogrammed by a user. Such complex operations are generally represented by macros in which a user has specified a number of events associated with user input devices which collectively cause a complex operation to be performed.

In addition, event structures representing simulated events can be generated and sent to simulate use of a computer process by a user in testing the computer process. Automatically testing computer processes, particularly graphical user interfaces of such computer processes, using event structures representing simulated events has a number of advantages over simply allowing users to test such computer processes. First, such event structures generally can be generated and sent much more quickly than event structures representing actual events can be generated through physical manipulation of user input devices by a user. Second, a particular sequence of events, which cause a computer process to execute erroneously or to enter an invalid state, can be conveniently and accurately repeated to analyze the erroneous behavior of the computer process if the events are predetermined and represented in a memory of the computer system prior to simulation of the events. Events generated by a user by physical manipulation of user input devices can be rather difficult to repeat accurately in sequence. Third, use of a computer process can be simulated at times and under conditions which are unpleasant for a user to use the computer process for testing purposes. For example, event structures representing simulated events can be generated and sent for many hours without requiring breaks or rest, allowing complex, lengthy tests of computer processes to be run, even during late night hours.

It is sometimes important that the resource manager complete processing of all previously received event structures, simulated or otherwise, prior to generation and sending of the next event structure representing a simulated event. For example, pressing a button on a pointing device can cause a computer process to display a new window, and no further event structures representing simulated events should be generated and sent prior to completion of the display of the new window. To ensure that processing of all previously sent event structures has been completed, a computer process can send to the resource manager signals representing an inquiry of the status of a event output queue of the resource manager. The event output queue of the resource manager contains event structures which are being sent from the resource manager to other computer processes. In response to the signals, the resource manager sends to the computer process signals representing the state of the event output queue, including whether the event output queue is empty When all event structures have been processed by the resource manager, the event output queue is empty However, if a computer process sends signals representing such an inquiry too soon after sending an event structure, the event output queue may be empty notwithstanding one or more outstanding event structures processing of which may have not been completed by the resource manager. If the computer process continues to generate and send event structures before processing of previously sent event structures is completed by the resource manager, the behavior of the computer process under test may not accurately represent the behavior of the computer process under test in response to events generated by a user through physical manipulation of user input devices.

Some conventional simulated event generators postpone generation and sending of event structures representing simulated events by a fixed delay. However, the proper amount of delay depends on the operational speed and efficiency of the resource manager, and that speed and efficiency varies substantially with changes in the execution environment of the resource manager, including the number of other computer processes executing in the computer system and the number of event structures currently being processed by the resource manager. If the fixed delay is selected to be greater than necessary, simulation of events is unnecessarily slowed resulting in reduced performance. Conversely, if the fixed delay is selected to be shorter than necessary, the behavior of the computer process under test is not accurately tested because subsequent event structures can be generated and sent before previously sent event structures have been processed.

What therefore persists as an unsolved need in the industry is a mechanism for ensuring that processing of previously sent event structures has been completed by the resource manager without postponing sending of subsequent event structures any longer than is substantially necessary.

SUMMARY OF THE INVENTION

In accordance with the present invention, a computer process determines that processing by a resource manager of all previously, sent event structures has been completed by sending a tag event structure after having sent the previously sent event structures and waiting for the tag event structure to be returned to the computer process by the resource manager. Since the resource manager processes all received event structures on a first-in-first-out basis, the tag event is only returned to the computer process once all previously sent event structures have been processed by the resource manager.

The tag event structure is an event structure which is a custom event type and which includes data which identifies the tag event structure as such. Accordingly, the computer process recognizes the tag event structure as such when the tag event structure is received from the resource manager.

Further in accordance with the present invention, a family of multiple events represent a complex action, such as the selection of a pull-down menu option by physical manipulation of a pointing device, and simulation of other events is suppressed until simulation of each element event of the family of events is simulated. Simulation of a family of events is represented in a state and simulation of any event first checks the state to verify that simulation of no family of events is in progress. Such verification triggers simulation of the next event of the family of events. Simulation of the last event of the family of events changes the state to indicate that no family of events is currently being simulated. Since simulation of events other than those of the family of events is suppressed, event structures representing each event of the event family can be created individually as each event of the family of events is simulated.

By contrast, conventional systems typically require creation of an event structure for each and every event of the family of events and sending of the event structures as a single group of event structures to a resource manager to prevent event structures representing other events from being processed within the sequence of event structures representing the family of events. Creating event structures to represent each and every event of a family of events requires significant resources including sufficient memory to store multiple event structures. In addition, since multiple event structures are sent to a resource manager as a single group, problems associated with synchronization of simulated events are exacerbated.

The use of tag events to synchronize processing of families of events enables effective synchronization of simulation of the events of the family. At points at which event simulation synchronization is required in the family of events, a tag event can be inserted. The next event of the family event is not simulated until processing of the tag event is completed by operation of the synchronization mechanism provided by tag event structures.

BRIEF DESCRIPTION OF THE DRAWINGS

FIG. 3 is a logic flow diagram of the sending of an event structure representing a simulated event in accordance with the present invention.

FIG. 7 is a logic flow diagram of a step of the logic flow diagram of FIG. 3 in which a tag event structure representing a tag event is sent for processing in accordance with the present invention.

FIG. 8 is a logic flow diagram of a step of the logic flow diagram of FIG. 4 in which a received tag event structure is recognized and accounted for in accordance with the present invention.

DETAILED DESCRIPTION

In accordance with the present invention, a computer process determines that processing of all previously posted event structures has been completed by a resource manager by sending a tag event structure after having sent the previously posted event structures and waiting for the tag event structure to be returned to the computer process by the resource manager. Since the resource manager processes all received event structures on a first-in-first-out basis, the tag event is only returned to the computer process once all previously sent event structures have been processed by the resource manager. A brief description of the operating environment of the resource manager and the computer process facilitates appreciation of the present invention.

Figure 1:
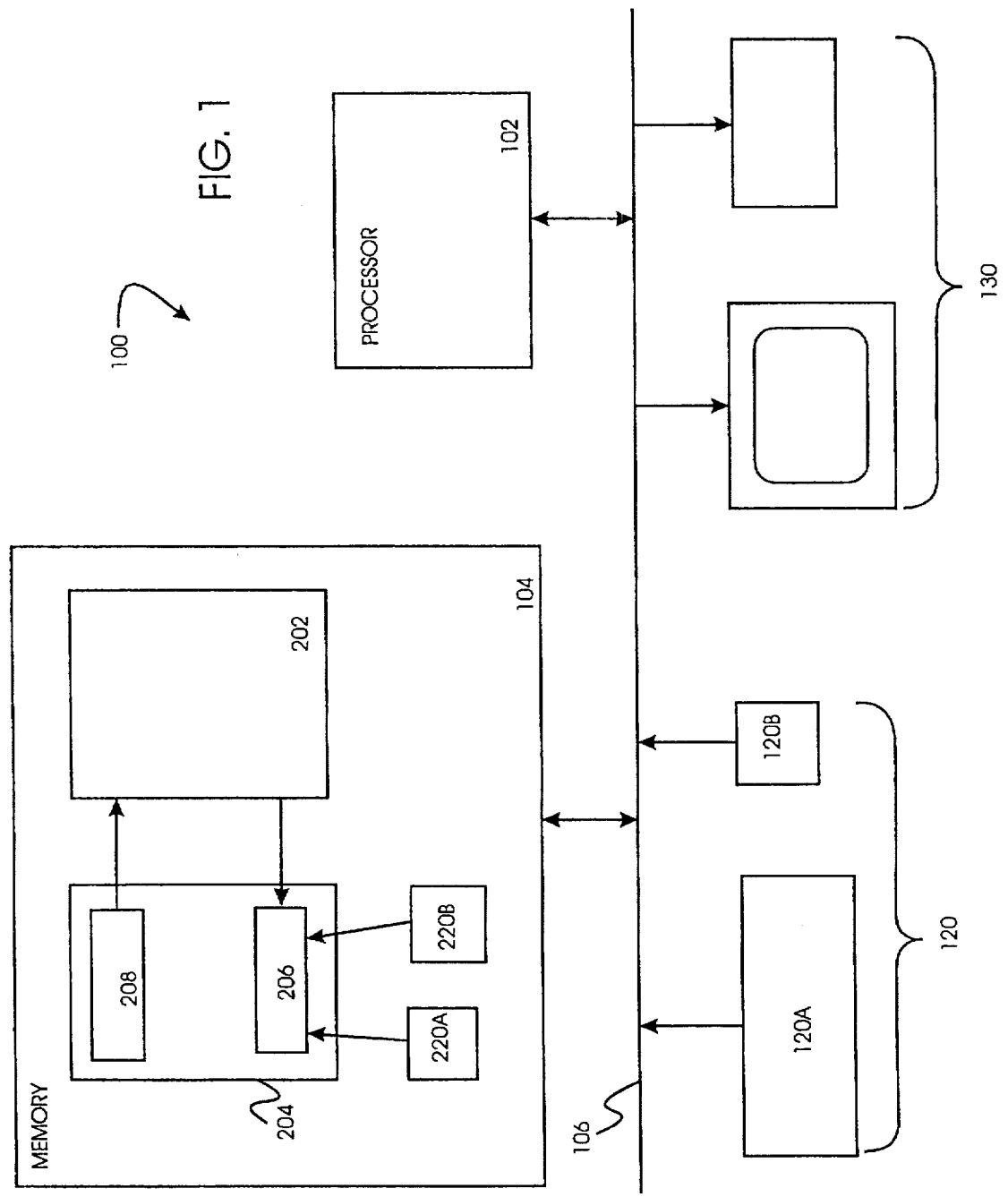
FIG. 1 is block diagram of a computer system which includes a resource manager and a computer process which synchronizes processing of event structures in accordance with the present invention.

FIG. 1 is a block diagram of a computer system 100 which is generally of the architecture of most computer systems available today. Computer system 100 includes a processor 102 which fetches computer instructions from a memory 104 through a bus 106 and executes those computer instructions. In executing computer instructions fetched from memory 104, processor 102 can retrieve data from or write data to memory 104, display information on one or more computer display devices 130, or receive command signals from one or more user-input devices 120. Processor 102 can be, for example, any of the SPARC processors available from Sun Microsystems, Inc. of Mountain View, Calif. Memory 104 can include any type of computer memory including, without limitation, randomly accessible memory CRAM, read-only memory (ROM), and storage devices which include magnetic and optical storage media such as magnetic or optical disks. Computer 100 can be, for example, any of the SPARCstation workstation computer systems available from Sun Microsystems, Inc. of Mountain View, Calif.

Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

Computer display devices 130 can include generally any computer display device such as a printer, a cathode ray tube (CRT), light-emitting diode (LED) display, or a liquid crystal display (LCD). User input devices 120A–B can include generally any user input device such as a keyboard, a keypad, an electronic mouse, a trackball, a digitizing tablet, thumbwheels, a light-sensitive pen, a touch-sensitive pad, or voice-recognition circuitry. User input devices 120A–B generate input signals in response to physical actions of a user. Each of user input devices 120A–B is associated with a respective one of input device drivers 220A–B, each of which is a computer process executing in processor 102 from memory 104. Each of input device drivers 220A–B retrieves from a respective one of user input devices 120A–B input signals and generates in response thereto event structures representing events indicated by the input signals. The event structures are then placed on a event input queue 206 for processing by a resource manager 204. Resource manager 204, event input queue 206, and the processing of event structures are described in greater detail below.

A number of computer processes execute in computer system 100 concurrently, including a computer process 202 and a resource manager 204. Resource manager 204 is conventional and is, in one embodiment, the known Xserver computer process which manages the graphical user interface of the known X Windows communication protocol of the UNIX operating system. Resource manager 204 receives, through an event input queue 206, event structures representing various events. Resource manager 204 processes each event structure in a conventional manner and in processing each event structure, changes the state of a computer display in one or more of computer display devices 130 and determines to which computer process to send each event structure according to the updated state of the computer display and according to the nature of the event represented by processed event structure. Prior to sending each event structure to a computer process, each processed event structure is stored in an event output queue 208, Device drivers 220A–B send to resource manager 204 event structures representing events involving respective user input devices. In addition, computer process 202 generates event structures representing simulated events and sends those event structures to resource manager 204. All event structures received by resource manager 204 are stored in event input queue 206 from which resource manager 204 retrieves event structures for processing in a first-in-first-out manner. As each event structure is processed by resource manager 204, the event structure is stored in event output queue 208 from which event structures are sent to computer processes in a first-in-first-out manner. Thus, resource manager 204 processes and dispatches, i.e., sends to computer processes, event structures in the order such event structures are received by resource manager 204.

Figure 2:
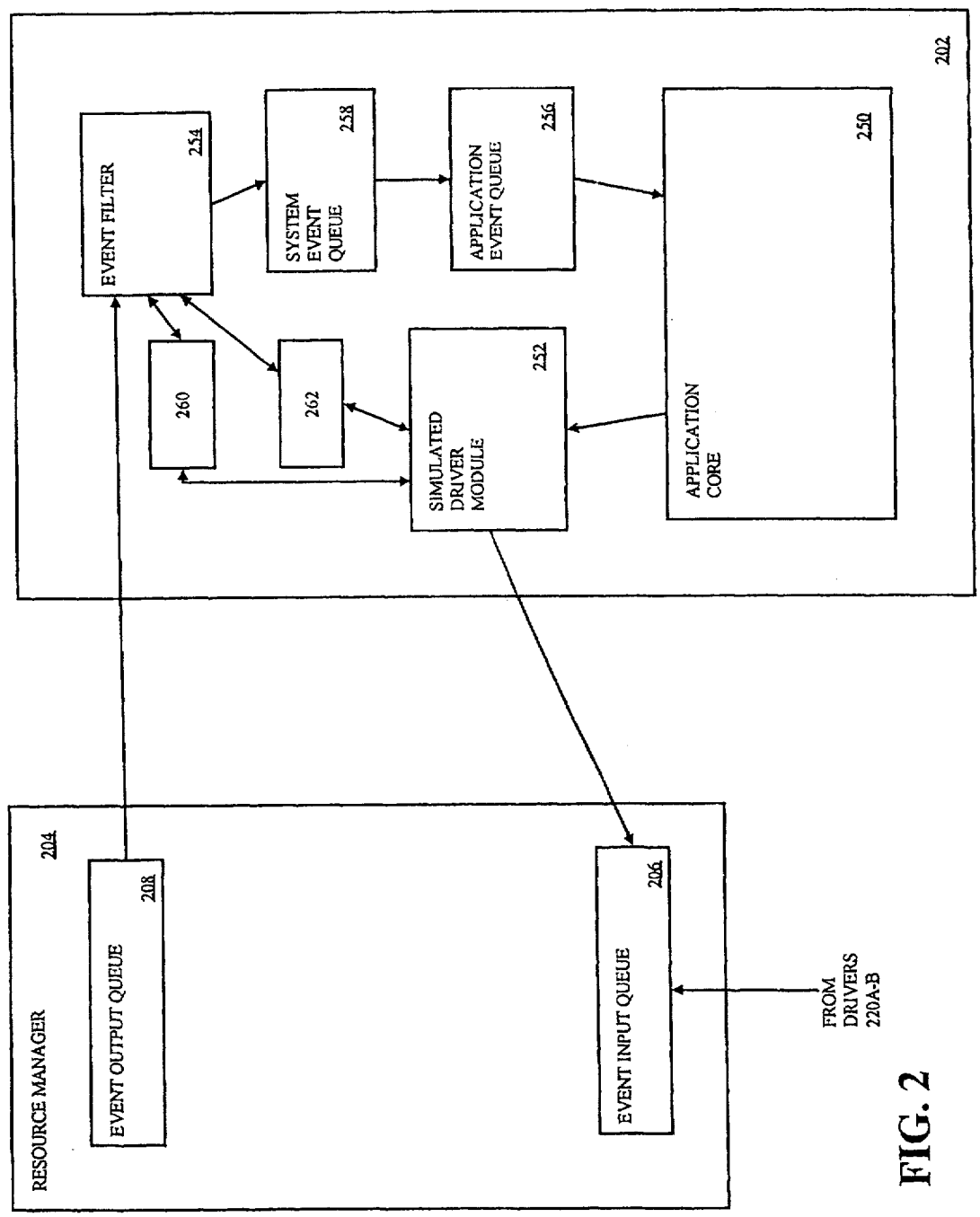
FIG. 2 is a block diagram of the resource manager and the computer process of FIG. 1 in greater detail.

Computer process 202, resource manager 204, event input queue 206, and event output queue 208 are shown in greater detail in FIG. 2. Computer process 202 includes an application core 250 which defines the central behavior of computer process 202. For example, if computer process 202 is configured to test the graphical user interface of a word processing computer process, application core 250 implements the word processing computer process and includes computer instructions and data implementing the graphical user interface under test. Computer process 202 also includes simulated driver module 252. Simulated driver module 252 generates event structures which represent simulated events, e.g., events resulting from physical manipulation of any of user input devices 120 (FIG. 1) by a user. For example, to simulate the entering of the text "The" by a user using a keyboard, simulated driver module 252 generates event structures representing the following simulated events in the following order: (i) Shift-key down; (ii) T-key down; (iii) T-key up; (iv) Shift-key up; (v) H-key down; (vi) H-key up; (vii) E-key down; and (viii) E-key up.

Simulated driver module 252 sends such event structures to event input queue 206 for processing by resource manager 204. Resource manager 204 processes the event structures in event input queue 206, which are received from drivers 220A–B and simulated driver module 252, in the manner described above.

It is sometimes important that simulated driver module 252 waits until resource manager 204 has completed processing of all pending event structures before generating additional event structures and sending them to event input queue 206. Ordinarily, simulated driver module 252 would determine that resource manager 204 has completed processing of all event structures placed on event input queue 206 by querying the status of event output queue 208 and determining that event output queue 208 is empty. Computer process 202 and resource manager 204 share a communications channel whereby computer process 202 can directly query resource manager 204 regarding the status of event output queue 208.

Determining that event output queue 208 is empty does not establish with certainty that resource manager 204 has completed processing of all previously posted event structures. For example, event output queue 208 can be empty while resource manager 204 processes event structures which are not yet included in event output queue 208, e.g., are still included in event input queue 206 awaiting processing by resource manager 204.

Figure 5:
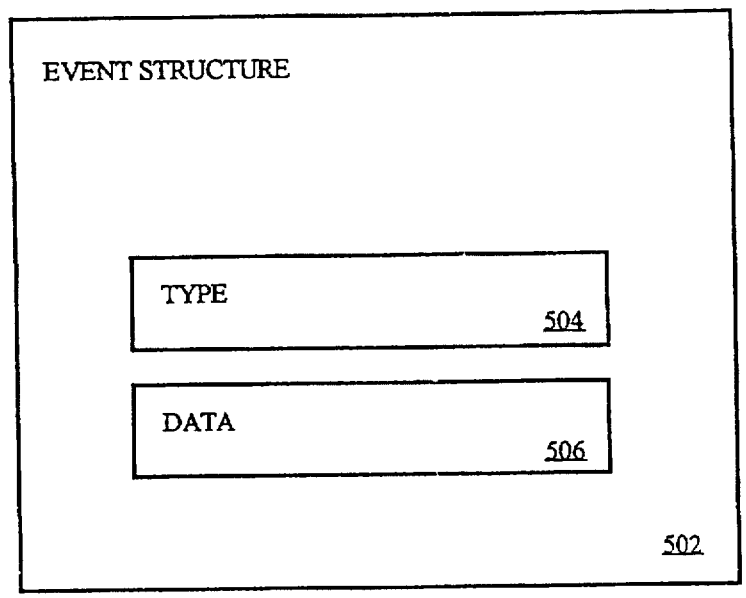
FIG. 5 is a block diagram of an event structure.

In accordance with the present invention, synchronization is achieved by use of tag event structures. FIG. 5 shows an event structure 502 whose structure is generally the, structure of event structures processed by resource manager 204. Event structure 502 includes a type field 504 and a data field 506. As used herein, a field is a collection of data which defines a single piece of information.

Type field 504 contains data which specifies the type of event represented by event structure 502. The type of event must generally be one of a number of types processed by resource manager 204. The types of events processed by resource manager 204 include a custom event type. In general, resource manager 204 processes event structures of the custom event type by forwarding such event structures to the computer process which owns a window to which the event structure pertains. If event structure 502 is a tag event structure, type field 504 contains data which specifies that event structure 502 is of the custom event type. Therefore, in processing event structure 502, resource manager 204 sends event structure 502 to computer process 202 through event output queue 208.

Data field 506 contains data which represents further information about the event represented by event structure 502. If event structure 502 represents a tag event, data field 506 contains data which identifies event structure 502 as a tag event structure, i.e., as an event structure which represents a tag event. Accordingly, when computer process 202 receives event structure 502, computer process 202 can identify event structure 502 as a tag event structure.

Resource manager 204, generally after processing an event structure, forwards the event structure to a window module which manages a window displayed in a computer display device, e.g., one of computer display devices 130, to which the event structure pertains. In a conventional manner, an event structure such as event structure 502 (FIG. 5) identifies a window displayed in a computer display device, e.g., one of computer display devices 130, to which the event structure pertains. A computer process such as computer process 202 generally includes a window module to manage each window owned by the computer process. If event structure 502 is a tag event structure, event structure 502 identifies a window owned by computer process 202 such that event structure 502 is eventually returned to computer process 202. Computer process 202 specify any window owned by computer process 202 as the window to which a tag event structure, e.g., event structure 502, pertains and processing of the tag event structure by resource manager 204 causes the tag event structure to be returned to computer process 202. In a preferred embodiment, computer process 202 creates a window which, performs no function other than receipt of tag event structures. Such simplifies identification of tag events as such. It is not necessary that the created window is actually displayed in any of computer display devices 130.

The simulation of an event by simulated driver module 252 is illustrated by logic flow diagram 300 (FIG. 3) in which processing begins in step 302. In step 302, simulated driver module 252 (FIG. 2) constructs an event structure, e.g., event structure 502 (FIG. 5), to represent the particular event simulated by simulated driver module 252 (FIG. 2). Processing transfers to step 304 (FIG. 3) in which simulated driver module 252 (FIG. 2) sends the constructed event structure to resource manager 204 for inclusion in event input queue 206. Simulated driver module 252 sends an event structure to resource manager 2Q4 for inclusion in event input queue 206 in a manner which is analogous to the conventional manner in which device drivers 220A-B send event structures to resource manager 204 for inclusion in event input queue 206. By sending an event structure to resource manager 204, simulated driver module 252 simulates events such as physical manipulation of input devices 120A-B (FIG. 1).

Processing transfers to step 306 (FIG. 3) in which simulated driver module 252 (FIG. 2) sends a tag event structure when appropriate for synchronization, i.e., when the event structure sent in step 304 should be completely processed by resource manager 204 prior to sending a subsequent event structure. In one embodiment, a tag event structure is sent in step 306 (FIG. 3) after each and every event structure sent in step 304. In an alternative embodiment, a tag event structure is sent in step 306 after sending an event structure representing a particular kind of event is sent in step 304. The particular kind of event can include, for example, events involving the pressing or release of a button of a pointing device, such as an electronic mouse or trackball, or the pressing or release of an ENTER key on a keyboard.

The sending of a tag event structure by simulated driver module 252 (FIG. 2) is illustrated by logic flow diagram 700 (FIG. 7) in which processing begins with step 702. In step 702, simulated driver module 252 (FIG. 2) constructs a tag event structure. For example, if event structure 502 (FIG. 5) is the event structure constructed by simulated driver module 252 (FIG. 2), simulated driver module 252 stores in type field 504 (FIG. 5) data which indicates that event structure 502 represents a custom event and stores in data field 506 data which identifies event structure 502 as an event structure which represents a tag event. Processing transfers to step 704 FIG. 7) in which simulated driver module 252 FIG. 2) increments a tag event counter 260. Prior to sending any tag event structures by simulated driver module 252 (FIG. 2), tag event counter 260 is initialized to a value of zero to indicate that no tag events are outstanding. Since tag event counter 260 is incremented in step 704 (FIG. 7), tag event counter 260 accurately represents the number of tag events which are outstanding. As described more completely below, tag event counter 260 is decremented when each tag event is received by computer process 202 such that tag event counter 260 continues to accurately represent the number of outstanding tag event structures, i.e., the number of tag event structures which have been sent to resource manager 204 and which have not yet been received from resource manager 204. Processing transfers to step 706 (FIG. 7) in which simulated driver module 252 (FIG. 2) sends the tag event structure to resource manager 204 for inclusion in event input queue 206 in an analogous manner to that described above with respect to step 304 (FIG. 3). After step 706 (FIG. 7), processing according to logic flow diagram 700 completes.

In a conventional manner, resource manager 204 (FIG. 2) retrieves from event input queue 206 and processes the event structure sent in step 304. (FIG. 3) and any tag event structure sent in step 306. When processing by resource manager 204 of such event structures is completed, resource manager 204 places the event structures on event output queue 208. Resource manager 204 then sends each of the event structures on event output queue 208 to the appropriate computer process as determined by resource manager 204 in a conventional manner as described above. After resource manager 204 completes processing of a event structure which corresponds to computer process 202, resource manager 204 sends the event structure to computer process 202.

Figure 4:
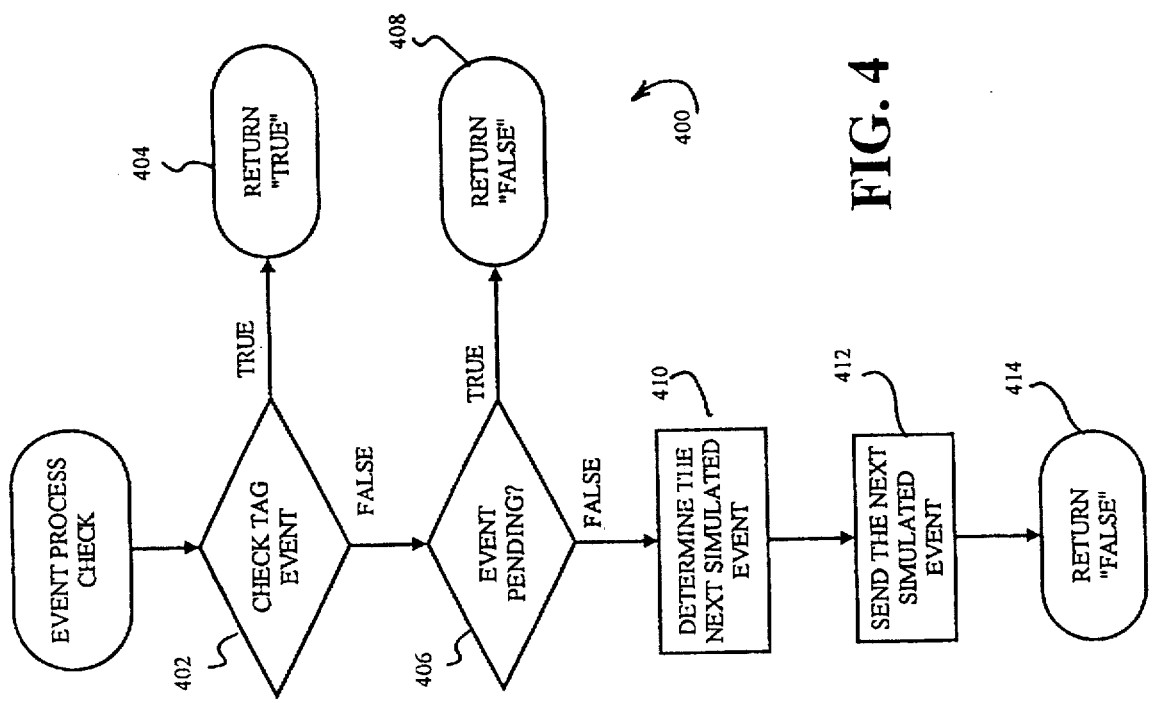
FIG. 4 is a logic flow diagram of the receipt of an event structure and synchronization of sending event structures in accordance with the present invention.

To recognize and process tag events received by computer process 202 from resource manager 204, an event filter 254 is installed in computer process 202 to intercept all event structures received by computer process 202 from resource manager 204. An event filter which intercepts event structures sent to computer process 202, e.g., event filter 254, can be installed in computer process 202 in a conventional manner. Each event structure received by computer process 202 is processed by event filter 254 according to logic flow diagram 400 (FIG. 4).

Processing according to logic flow diagram 400 begins in test step 402. In test step 402, event filter 254 (FIG. 2) determines whether the received event structure is a tag event structure. Test step 402 is shown in greater detail as logic flow diagram 402 (FIG. 8) in which processing begins in test step 802. In test step 802, event filter 254 (FIG. 2) determines whether the received event structure is a tag event structure by comparison of fields of the received event structure to data identifyig a tag event structure. Specifically, if event structure 502 (FIG. 5) is the received event structure, event filter 254 (FIG. 2) compares type field 504 to data representing the custom event type and compares data field 506 to data identifying a tag event structure.

If type field 504 contains data which does not represent the custom event type or data field 506 does not identify a tag event structure, processing transfers to return step 804 in which processing according to logic flow diagram 402 determines that the received event structure is not a tag event structure and processing according to logic flow diagram 402, and therefore test step 402 (FIG. 4), completes. Conversely, if type field 504 (FIG. 5) contains data representing the custom event type and data field 506 contains data identifying a tag event structure, processing transfers from test step 802 FIG. 8) to step 806. In step 806, event filter 254 (FIG. 2) decrements tag event counter 260 to reflect that one less tag event structure is outstanding. Accordingly, tag event counter 260 is updated to accurately represent the number of outstanding tag event structures, i.e., the number of tag event structures which have been sent to resource manager 204 and which have not yet been received from resource manager 204. Processing transfers from step 806 (FIG. 8) to step 808 in which processing according to logic flow diagram 402 determines that the received event structure is a tag event structure and processing according to logic flow diagram 402, and therefore test step 402 (FIG. 4), completes.

Figure 9:
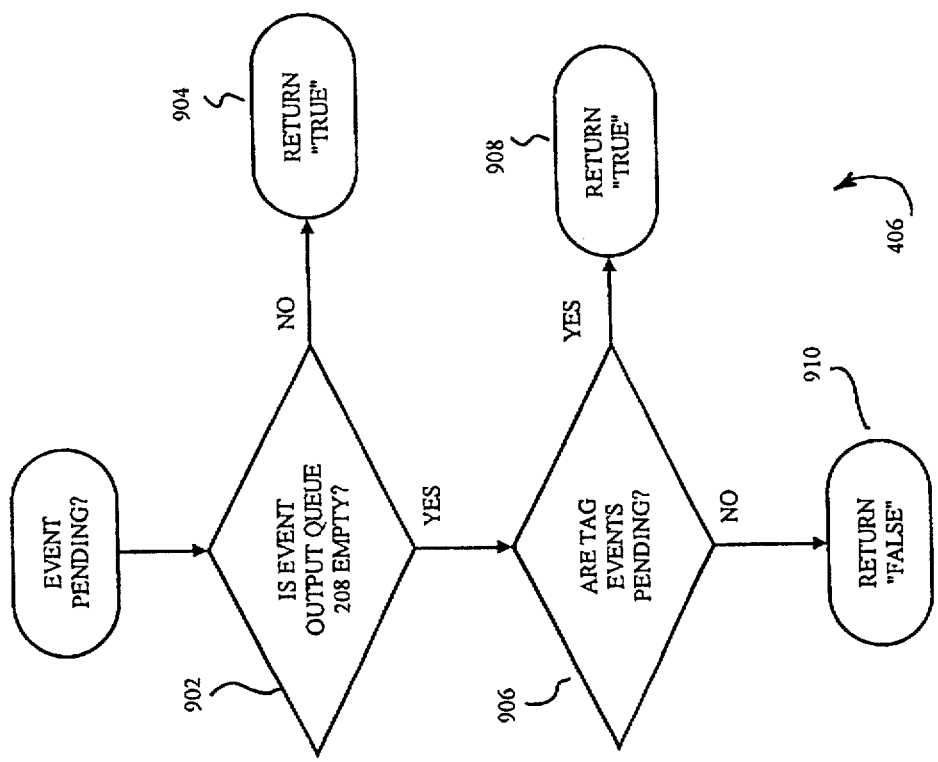
FIG. 9 is a logic flow diagram of a step of the logic flow diagram of FIG. 4 in which a determination regarding the status of processing of previously sent event structures is made in accordance with the present invention.

If event filter 254 (FIG. 2) determines in test step 402 (FIG. 4) that the received event structure is a tag event structure, processing transfers to step 404 in which processing according to logic flow diagram 400 by event filter 254 (FIG. 2) determines that event filter 254 detected and intercepted a tag event structure and completes. Conversely, if event filter 254 determines that the received event structure is not a tag event structure, processing transfers from test step 402 to test step 406 in which event filter 254 (FIG. 2) determines whether event structures which have been previously sent to resource manager 204 have not yet been completely processed by resource manager 204, i.e., whether any event structures are pending within resource manager 204. Test step 406 is shown in greater detail as logic flow diagram 406 (FIG. 9).

Processing according to logic flow diagram 406 begins in test step 902 in which event filter 254 (FIG. 2) determines whether event output queue 208 of resource manager 204 is empty by sending to resource manager 204 signals which query the status of event output queue 208 in the manner described above. If event output queue 208 is not empty, processing transfers to step 904 (FIG. 9) in which processing according to logic flow diagram 406 terminates with a determination that an event structure is pending within resource manager 204 (FIG. 2). Conversely, if event output queue 208 is empty, processing transfers from test step 902 (FIG. 9) to test step 906.

In test step 906, event filter 254 (FIG. 2) determines whether any tag event structures are outstanding. Event filter 254 makes such a determination by comparing the value represented by tag event counter 260 to a value of zero. If the value represented by tag event counter 260 is greater than zero, tag event counter 260 has been incremented in step 704 (FIG. 7) more than tag event counter 260 (FIG. 2) has been decremented in step 806 (FIG. 8), i.e., more tag event structures have been sent to resource manager 204 than have been received from resource manager 204. Thus, if tag event counter 260 is greater than zero, processing transfers from test step 906 (FIG. 9) to step 908 in which processing according to logic flow diagram 406 terminates with a determination that one or more event structures are pending within resource manager 204 (FIG. 2). Conversely, if event filter 254 (FIG. 2) determines that the value represented by tag event counter 260 is not greater than zero, processing transfers to step 910 in which processing according to logic flow diagram 406 terminates with a determination that no event structure is pending within resource manager 204 (FIG. 2). Since event filter 254 determines that all tag event structures sent to resource manager 204 have been received from resource manager 204, event filter 254 more accurately determines that resource manager 204 has completed processing of all previously sent event structures than by reference only to event output queue 208.

If processing according to logic flow diagram 406 (FIG. 9), and therefore test step 406 (FIG. 4), determines that one or more event structures are pending within resource manager 204 (FIG. 2), processing transfers from test step 406 (FIG. 4) to step 408. In step 408, processing according to logic flow diagram 400 by event filter 254 (FIG. 2) determines that event filter 254 did not detect and intercept a tag event structure and completes. Conversely, if in test step 406 (FIG. 4) event filter 254 (FIG. 2) determines that no event structure is pending within resource manager 204, processing transfers to steps 410 (FIG. 4) and 412 in which event filter 254 (FIG. 2) respectively determines the next event to be simulated by simulated driver module 252 and sends to simulated driver module 252 signals which cause simulated driver module 252 to send an event structure representing the next event according to logic flow diagram 300 (FIG. 3) as described above. Processing transfers to step 414 in which processing according to logic flow diagram 400 by event filter 254 (FIG. 2) determines that event filter 254 did not detect and intercept a tag event structure and completes. Thus, a subsequent event is simulated by sending to event input queue 206 of resource manager 204 after first determining, in test step 406 (FIG. 4), that all previously sent event structures have been completely processed by resource manager 204 (FIG. 2).

In accordance with the present invention, simulated driver module 252 sends to event input queue 206 of resource manager 204 a tag event structure in step 306 (FIG. 3) when it is determined that all previously sent event structures should be completely processed prior to sending the next event structure. Furthermore, the next event structure is not sent to event input queue 206 of resource manager 204 until event filter 254 receives the tag event from event output queue 208 of resource manager 204 as determined in test step 906 (FIG. 9). Since resource manager 204 processes event structures in a first-in-first-out manner, receipt of the tag event structure indicates with substantial certainty that resource manager 204 has completed processing of all event structures previously received from simulated driver module 252.

If event filter 254 determines according to logic flow diagram 400 (FIG. 4) that an event structure received from resource manager 204 through event output queue 208, as described above with respect to steps 408 and 414, event filter 254 forwards the received event structure for processing by system event queue 258, application event queue 256, and application core 250. System event queue 258 processes and sends to application event queue 256 event structures received from event filter 254 in a first-in-first-out manner.

System event queue 258 is described more completely below. In an alternative embodiment, system event queue 258 is omitted and event structures are passed directly to application event queue 256 by event filter 254. Application event queue 256 receives event structures and processes the received event structures in a convention manner and in a first-in-first-out manner. Since event filter 254 does not pass any tag event structures to application event queue 256 directly or indirectly, i.e., through system event queue 258, system event queue 258 and application event queue 256 process event structures in a conventional manner. In processing such event structures, computer process 202 issues computer instructions to processor 102 (FIG. 1) to cause actions to be taken in response to the events represented by the event structures processed.

In one embodiment, computer system 100 (FIG. 1) executes, and computer process 202 is created within, the Solaris operating system available from Sun Microsystems, Inc. of Mountain View, Calif. In this embodiment, system event queue 258 is the OpenStep Queue of the Open Step graphical user interface library and can be included in computer process 202 during creation of computer process 202. In this embodiment, system event queue 258 can recognize tag event structures as inoperative event structures and will therefore not forward tag event structures to any subsequent component of computer process 202. Accordingly, event filter 254 precedes system event queue 258 in the processing of event structures.

Event Family Synchronization

It is frequently desirable to send a number of event structures which represent a single, complex action taken by a user. For example, a single action by a user can be the selection of a menu item from a pull-down menu. Such an action involves a number of discrete but related events such as movement of a pointing device such as a electric mouse to position a cursor in a computer display over the menu item, actuation of a button on the pointing device and release of the button. Another example of such a single, complex action is the entering of a series of alphanumeric characters through physical manipulation of a keyboard by a user. Such an action involves a number of discrete but related events such as pressing and releasing various buttons of the keyboard. Events which collectively represent such a single, complex action are sometimes referred to as a family of events. It is generally preferred that, once an event structure for an event of the family of events is sent to resource manager 204 (FIG. 2) for processing, an event structure for each of the events of a family of events is sent to resource manager 204 before any other event structures are sent to resource manager 204 for processing.

Figure 12:
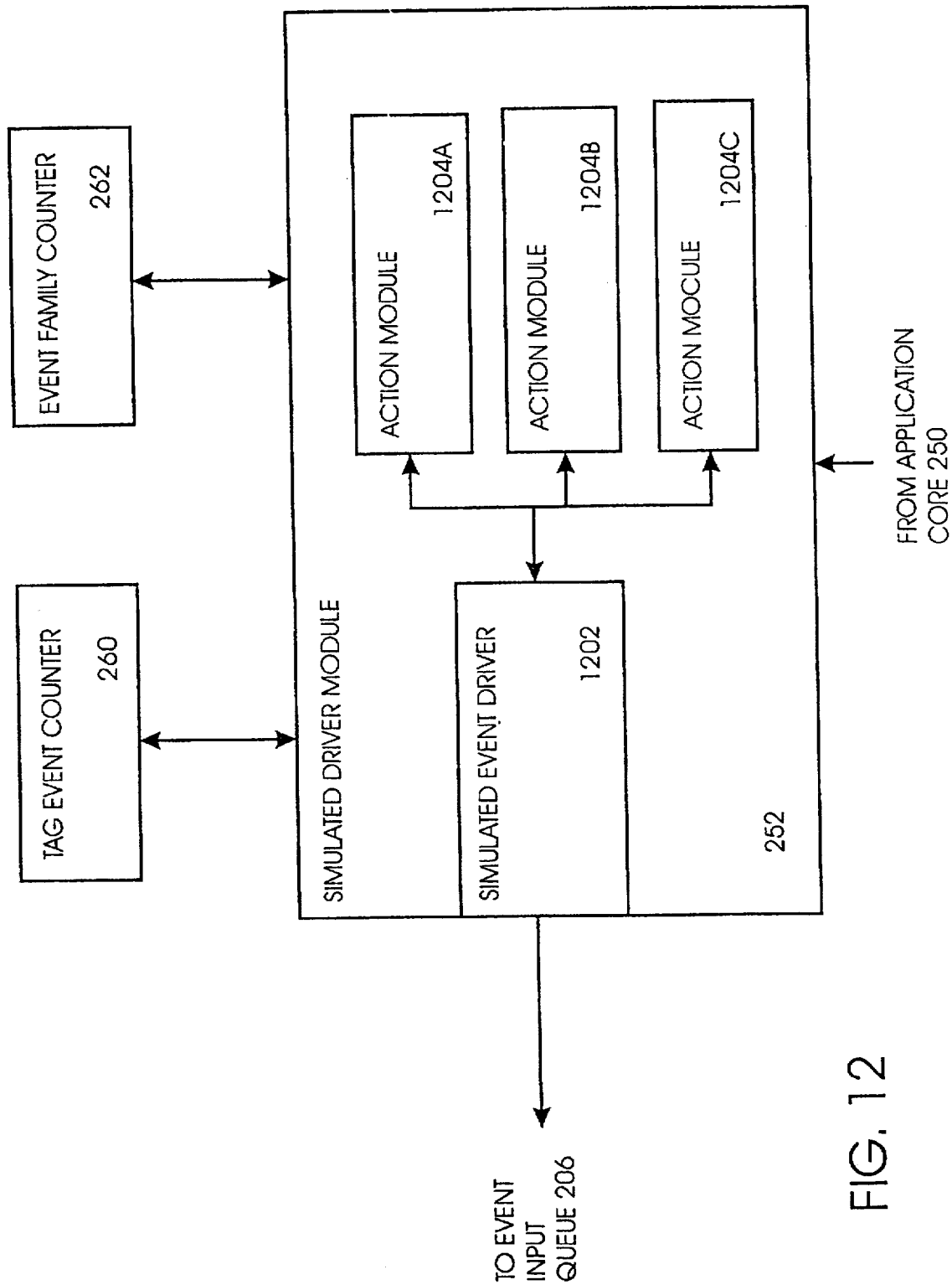
FIG. 12 is a block diagram illustrating action modules which cause simulated event driver to send event structures representing family events to resource manager for processing.

To facilitate appreciation of the utility and benefit of processing a family of events, one embodiment of simulated driver module 252 is shown in greater detail in FIG. 12. Simulated driver module 252 includes a simulated event driver 1202 which, in the manner described above, sends event structures to event input queue 206 of resource manager 204 for processing. Simulated driver module 252 also includes a number of modules, each of which can construct event structures and send them to simulated event driver 1202 for processing by resource manager 204 (FIG. 2). In the example illustrated in FIG. 12, simulated driver module 252 includes action modules 1204A–C, each of which causes simulated event driver 1202 to send event structures representing events of a family events to resource manager 204 (FIG. 2) for processing.

Suppose, for example, that action modules 1204A–B each have a respective family of events which are to be simulated by construction of appropriate event structures and sending the event structures to resource manager 204 (FIG. 2) for processing. One way to ensure that events of one family of events are not interleaved with events of the other family of events is to cause action modules 1204A–B to send, in one burst, a series of event structures representing all events of a family of events. However, such requires substantial amounts of memory 104 (FIG. 1) to represent contemporaneously numerous events of a family of events and added complexity in simulated event driver 1202 to receive and process sequences of multiple event structures. However, in a preferred embodiment of the present invention, each of action modules 1204A–C sends a single event structure to simulated event driver 1202 for sending to and processing by resource manager 204 (FIG. 2) and an event family counter 262 is used to ensure that event structures representing all events of a family of events are received by simulated event driver 1202 (FIG. 12) prior to receiving any event structures representing events of a subsequent family of events.

Simulated driver module 252 (FIG. 2) sends a family of events to event input queue 206 of resource manager 204 according to logic flow diagram 600 (FIG. 6) in which processing begins in step 602. Logic flow diagram 600 (FIG. 6) is described in the context of an illustrative example in which action module 1202A (FIG. 12) sends to simulated event driver 252 event structures representing events of a family of events. In step 602 (FIG. 6), action module 1204A installs in simulated driver module 252 an event family processing check module whose processing is illustrated in logic flow diagram 1002 (FIG. 11) and which is described below more completely. Processing transfers to step 604 (FIG. 6) in which action module 1204A (FIG. 12) increments family event counter 262. Family event counter 262 initially has a value of zero to indicate that no event families are being processed by simulated driver module 252. Since family event counter 262 is incremented in step 604, family event counter 262 indicates that a family of events is currently being processed by simulated driver module 252.

In step 606 (FIG. 6), action module 1204A (FIG. 12) invokes the event family processing check module within simulated event driver 1202 to initiate processing of the subject family of events. After step 606 (FIG. 6), processing according to logic flow diagram 600 completes. Processing of the event family processing check module is illustrated by logic flow diagram 1002 (FIG. 11) and begins with test step 1102. In test step 1102, action module 1204A (FIG. 12) determines whether action module 1204A is currently processing a family of events by comparison of the value of family event counter 262 to a value of zero. If no family of events is currently being processed, i.e., if the value of family event counter 262 is zero, processing transfers to step 1104 (FIG. 11) in which processing according to logic flow diagram 1002 completes determining that no family of events is being processed. Conversely, if the value of family event counter 262 (FIG. 12) is greater than zero, processing transfers from test step 1102 (FIG. 11) to step 1106. In the context of step 606 (FIG. 6), family event counter 262 (FIG. 12) is incremented in step 604 (FIG. 6) and processing therefore transfers from test step 1102 (FIG. 11) to step 1106.

Figure 11:
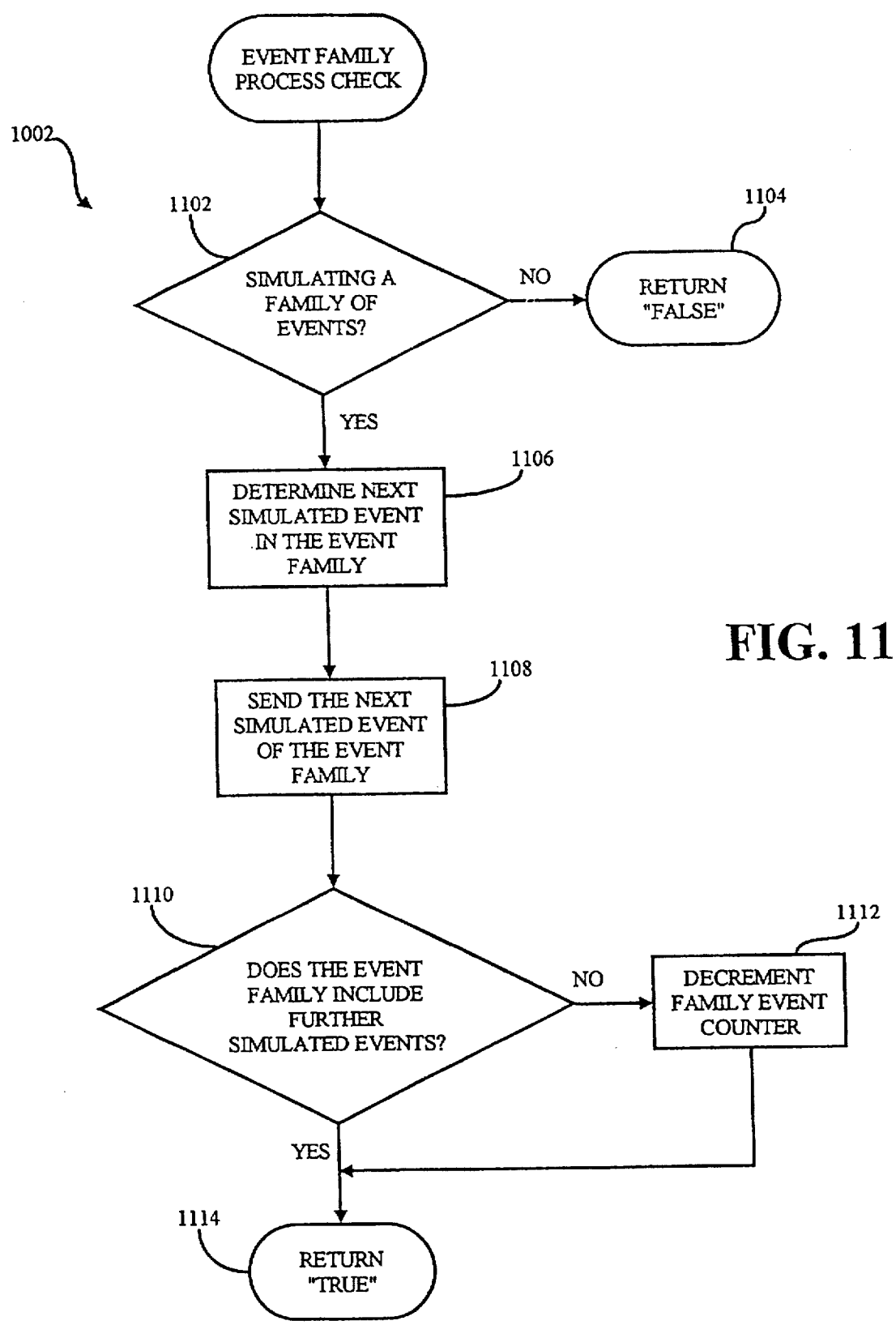
FIG. 11 is a logic flow diagram of a step of the logic flow diagram of FIG. 10 in which the next element event structure of a family of events is processed according to the present invention.

In step 1106, action module 1204A (FIG. 12) determines which of the events of the family of events to simulate next. Action module 1204A can determine which of the elements to simulated next by recording data which indicates which events of the family of events have been processed in previous performances of steps 1104 and 1106 (FIG. 11). Processing transfers to step 1108 in which action module 1204A constructs an event structure representing the event selected in step 1106 and sends the event structure through simulated event driver 1202 to resource manager 204 (FIG. 2) for processing. In one embodiment, action module 1204A does not construct event structures representing the remaining events of the family of events until each such structure is needed for processing by resource manager 204. To facilitate specific desired synchronization, action module 1204A can include tag events in the family of events as determined by an engineer designing and implementing action module 1204A. The synchronization mechanism described above ensures that no event structure representing an element of the family of events is sent to resource manager 204 until resource manager 204 has completed processing of all previous sent event structures of the family of events have been processed.

Processing transfers from step 1108 (FIG. 11) to test step 110 in which action module 1204A (FIG. 12) determines whether the subject family of events includes elements which have not been processed according to steps 1106 (FIG. 11) and 1108 as described above. If all elements of the subject family of events have been processed, processing transfers to step 1112 in which action module 1204A (FIG. 12) decrements family event counter 262 to indicate that processing of the subject family of events has completed. Processing transfers from step 1112 (FIG. 12) to step 1114. In addition, if action module 1204A (FIG. 12) determines in test step 1110 (FIG. 11) that at least one of the events of the subject family of events has not been processed according to steps 1106 and 1108, processing transfers from test step 1110 directly to step 1114, bypassing step 1112. In step 1114, processing according to logic flow diagram 1002 completes determining that simulated driver module 252 is currently processing a family of events.

Logic flow diagram 400 (FIG. 4), which illustrates the processing of event structures received by resource manager 204 by event filter 254, is modified as shown in logic flow diagram 400B (FIG. 10) to illustrate processing of received event structures by event filter 254 to process families of events. Specifically, logic flow diagram 400B (FIG. 10) shows a test step 1002 inserted between test step 406 and step 410 of logic flow diagram 400 (FIG. 4) and a test step 1006 (FIG. 10) inserted between step 410 and step 412 of logic flow diagram 400 (FIG. 4).

Upon determining in test step 406 that no event structure has been sent to resource manager 204 (FIG. 2) and has not yet been received from resource manager 204, processing transfers to test step 1002 in which event filter 254 determines whether a family of events is currently being simulated by simulated driver module 252 and event filter 254 in the manner described above with respect to logic flow diagram 1002 (FIG. 11). If processing by event filter 254 according to logic flow diagram 1002 determines that a family of events is currently being processed, processing transfers to step 1004. In step 1004, processing according to logic flow diagram 400B completes determining that event filter 254 did not detect and intercept a tag event structure in the manner described above with respect to step 408 (FIG. 4). Conversely, if processing by event filter 254 (FIG. 2) according to logic flow diagram 1002 determines that no family of events is currently being processed, processing transfers from test step 1002 to step 410.

Figure 10:
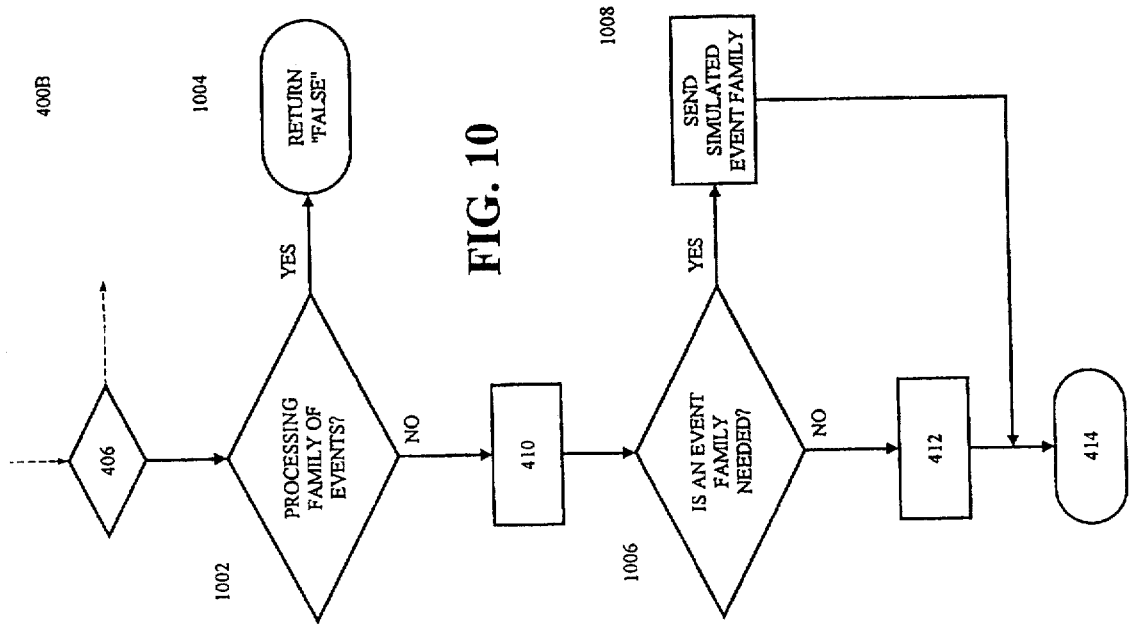
FIG. 10 is a logic flow diagram illustrating adaptation of the logic flow diagram of FIG. 4 to process families of events in accordance with the present invention.

It should be noted that event filter 254 processes according to logic flow diagram 400B, which is directly analogous to logic flow diagram 400 except as otherwise noted, for each event structure received by event filter 254 from resource manager 204. By repeated performances of test step 1002, and accordingly repeated performances of steps 1106 (FIG. 11) and 1108, simulated driver module 252 (FIG. 2) sends to resource manager 204 element event structures representing each element of a family of events and event filter 254 receives from resource manager 204 each of the event structures prior to processing an event which is not a member event of the family of events in step 410 (FIG. 10). Specifically, processing by event filter 254 (FIG. 2) only transfers to step 410 (FIG. 10) after family event counter 262 (FIG. 2) is decremented to a value of zero in a performance of step 1112 (FIG. 11) and a subsequent performance of the steps of logic flow diagram 1002 determines in step 1104 that no family of events is currently being processed.

In step 410 (FIG. 10), the next event to simulate is determined. In one embodiment, the determination of the next event to simulate is performed by simulated driver module 252 (FIG. 12). In determining which event to simulate next, simulated driver module 252 signals one of action modules 1204A–C to select an event for simulation. The manner in which simulated driver module 252 determines which of action modules 1204A–C to signal is dependent upon the particular design and implementation of simulated driver module 252 by an engineer as determined by the nature of the simulation to be carried out by simulated driver module 252. In this illustrative example, simulated driver module 252 signals action module 1204B to initiate simulation of the next event. As described above, step 410 (FIG. 10) is not performed until all events of all previously simulated families of events have been simulated. Therefore, simulation of a family of events by action module 1204A (FIG. 12) as described above in the illustrative example has completed before simulated driver module 252 signals action module 1204B to initiate simulation of the next event.

Figure 6:
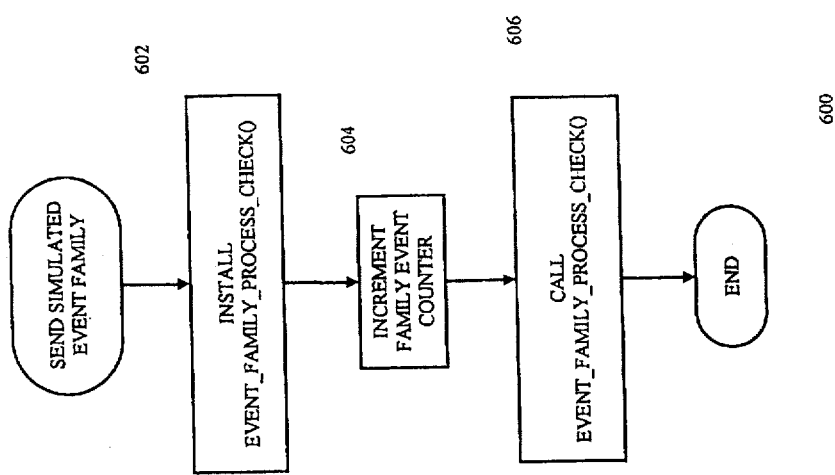
FIG. 6 is a logic flow diagram of the processing of a family of events in accordance with the present invention.

Processing transfers from step 410 (FIG. 10) to test step 1006 in which action module 1204B (FIG. 12) determines whether the next event to simulate as determined by action module 1204B in step 410 (FIG. 10) is a family of events. If the next event to simulate is not a family of events, processing transfers from test step 1006 to step 412 with is described above. Conversely, if the next event to simulate is a family of events, processing transfers to step 1008 in which action module 1204B initiates simulation of the events of the family of events in the manner described above with respect to logic flow diagram 600 (FIG. 6). Processing transfers from step 1008 to step 414 which is described above.

The above description is illustrative only and is not limiting. The present invention is therefore defined solely and completely by the appended claims together with their full scope of equivalents.

What is claimed is:

1. A method for determining that processing of one or more event structures which have been sent to a resource manager for processing by the resource manager is completed, the method comprising:

an event creator constructing a tag event structure, processing of which by the resource manager returns the tag event structure to the event creator, wherein the processing by the resource manager includes managing the flow of event structures for receipt by one or more processes;

sending the tag event structure for processing by the resource manager after the one or more event structures have been sent to the resource manager for processing;

receiving the tag event structure, wherein receipt of the tag event structure indicates that the tag event structure has been processed by the resource manager;

determining that processing by the resource manager of the one or more event structures which have been sent to the resource manager for processing is completed when the tag event structure is received; and sending a subsequent event structure to the resource manager after receipt of the tag event structure, whereby the sending of the subsequent even structure is delayed until it is determined that processing of the one or more event structures by the resource manager has been completed.

2. A method for simulating a family of two or more events, the method comprising:

simulating the family of events, wherein simulating the family of events includes sending each of the events of the family of events to a resource manager for processing by the resource manager, wherein the processing by the resource manager includes managing the flow of event structures for receipt by one or more processes;

prior to simulating a subsequent event which is not included in the family of events, verifying that all events of the family of events have been simulated by verifying that all events of the family of events have been processed by the resource manager; and sending the subsequent event to the resource manager for processing upon verification that all events of the family of events have been processed by the resource manager.

3. The method of claim 2 wherein the step of simulating comprises:

an event creator constructing a first event structure which represents a first event of the family of events; and sending the first event structure to the resource manager for processing.

4. The method of claim 2 further comprising:

recording, in a memory of a computer, a state which indicates that simulation of the family of events is in progress; and wherein the step of verifying includes comparing the recorded state with data indicating that simulation of a family of events is in progress.

5. The method of claim 2 further comprising:

performing the following steps prior to simulating if the subsequent event;

(1) an event creator constructing a tag event structure, processing of which by the resource manager returns the tag event structure to the event creator;

(2) sending the tag event structure to the resource manager for processing by the resource manager; and (3) receiving the tag event structure, wherein receipt of the tag event structure indicates that the tag event structure has been processed by the resource manager.

6. A computer program product comprising:

a computer usable medium having computable readable code embodied therein for determining that processing of one or more event structures which have been sent to a resource manager for processing by the resource manager is completed, wherein the processing by the resource manager includes managing the flow of event structures for receipt by one or more processes, the computer readable code comprising:

a construction module which is configured to construct a tag event structure, processing of which by the resource manager returns the tag event structure to a selected computer process, which includes the construction module;

a dispatch module, which is operatively coupled to the construction module and which is configured to send the tag event structure to the resource manager for processing after the one or more event structures have been sent to the resource manager for processing by the resource manager; and an event filter which is operatively coupled to the dispatch module and which is configured to receive the tag event structure, wherein receipt of the tag event structure indicates that the tag event structure has been processed by the resource manager, and the event filter is further configured to determine that processing of the one or more event structures which have been sent to the resource manager for processing is completed when the tag event structure is received, whereby the determination of the completion of the processing of the one or more event structures may be used to delay sending of a subsequent event structure to the resource manager until after the processing of the one or more event structures has been completed.

7. A computer program product comprising:

a computer usable medium having computable readable code embodied therein simulating a family of two or more events, the computer readable code comprising:

an event simulation module which is configured to simulate the family of events, wherein simulating the family of events includes sending each event of the family of events, to a resource manager for processing by the resource manager, wherein processing by the resource manager includes managing the flow of event structures for receipt by one or more processes;

a family event simulation status verification module which is operatively coupled to the event simulation module and which is configured to verify that all events of the family of events have been simulated prior to enabling simulation of a subsequent event which is not included in the family of evenly and wherein simulation of the subsequent event is enabled if the simulation of the events of the family of events have been verified.

8. The computer program product of claim 7 wherein the event simulation module comprises:

an event structure constructor which is configured to construct a first event structure which represents a first event of the family of events; and an event structure dispatcher which is operatively coupled to the event structure constructor and which is configured to send the first event structure to the resource manager for processing.

9. The computer program product of claim 7 further comprising:

a simulation status module which is configured to record, in a memory of a computer, a state which indicates that simulation of the family of events is in progress;

wherein the family event simulation status verification module is further configured to compare the recorded state with data indicating that simulation of the family of events is in progress.

10. The computer program product of claim 9 further comprising:

an event synchronization module which is configured to ensure that simulation of a prior one of the family of events is completed and which comprises:

(1) a tag event structure constructor which is configured to construct a tag event structure processing of which by the resource, manager returns the tag event structure;

(2) a tag event structure dispatcher which is operatively coupled to the tag event structure constructor and which is configured to send the tag event structure to the resource manager for processing by the resource manager; and (3) a tag event structure receiver which is operatively coupled to the tag structure dispatcher and which is configured to receive the tag event structure, wherein receipt of the tag event structure indicates that the tag event structure has been processed by the resource manager.

11. An apparatus comprising:

a construction module which is configured to construct a tag event structure, processing of which by a resource manner returns the tag event structure to a computer process which includes the construction module, wherein the processing by the resource manager includes managing the flow of event structures for receipt by the computer process;

a dispatch module, which is operatively coupled to the construction module and which is configured to send the tag event structure to the resource manager for processing after a one or more event structures have been sent to the resource manager for processing by the resource manager; and an event filter which is operatively coupled to the dispatch module and which is configured to receive the tag event structure, wherein receipt of the tag event structure indicates that the tag event structure has been processed by the resource manager, and the event filter is further configured to determine that processing of the one or more event structures which have been sent to the resource manager for processing is completed when the tag event structure is received;

whereby the determination of the completion of the processing of the one or more even structures may be used to delay sending of a subsequent event structure to the resource manager until after the processing of the one or more event structures has been completed.

12. An apparatus comprising:

an event simulation module which is configured to simulate a family of two or more events, wherein simulation of the family of events includes sending each event of the family of events to a resource manager for processing by the resource manager, and wherein processing by the resource manager includes managing the flow of event structures for receipt by one or more processes; and a family event simulation status verification module which is operatively coupled to the event simulation module and which is configured to verify that all events of the family of events have been simulated prior to enabling simulation of a subsequent event which is not included in the family of events, wherein simulation of the subsequent event is enabled if the simulation of all events of the family of events has been verified.

13. The apparatus of claim 12 wherein the event simulation module comprises:

an event structure constructor which is configured to construct a first event structure which represents a first event of the family of events; and an event structure dispatcher which is operatively coupled to the event structure constructor and which is configured to send the first event structure to the resource manager for processing.

14. The apparatus of claim 16 further comprising:

a simulation status module which is configured to records in a memory of a computer, a state which indicates that simulation of family of events is in progress;

wherein the family event simulation status verification module is further configured to compare the recorded state with data indicating that simulation of the family of events is in progress.

15. The apparatus of claim 12 further comprising:

an event synchronization module which is configured to ensure that simulation of a prior one of the family of events is completed and which comprises:

(1) a tag event structure constructor which is configured to construct a tag event structure, processing of which by the resource manager returns the tag event structure;

(2) a tag event structure dispatcher which is operatively coupled to the tag event structure constructor and which is configured to send the tag event structure to the resource manager for processing; and (3) a tag event structure receiver which is operatively coupled to the tag event structure dispatcher and which is configured to receive the tag event structure, wherein receipt of the tag event structure indicates that the tag event structure has been processed by the resource manager.

16. A computer system comprising:

a computer processor;

a memory which is operatively coupled to the computer processor; and a computer process which executes in the computer processor from the memory and which includes:

a construction module which is configured to construct a tag event structure, processing of which by a resource manager returns the tag event structure to the computer process, wherein the processing by the resource manager includes managing the flow of event structures for receipt by the computer process;

a dispatch module, which is operatively coupled to the construction module and which is configured to send the tag event structure to the resource manager for processing after a one or more event structures have been sent to the resource manager for processing by the resource manager; and an event filter which is operatively coupled to the dispatch module and which is configured to receive the tag event structure, wherein receipt of the tag event structure indicates that the tag event structure has been processed by the resource manager, and the event filter is further configured to determine that processing of the one or more event structures which have been sent to the resource manager for processing is completed when the tag event structure is received;

whereby the determination of the completion of the processing of the one or more event structures may be used to delay sending of a subsequent event structure to the resource manager until after the processing of the one or more event structures has been completed.

17. A computer system comprising:

a computer processor;

a memory which is operatively coupled to the computer processor; and a computer process which executes in the computer processor from the memory and which includes:

an event simulation module which is configured to simulate a first event of a family of two or more events, wherein simulation of the first event includes sending the first event to a resource manager for processing, and wherein processing by the resource manager includes managing the flow of event structures for receipt by a computer process;

a family event simulation status verification module which is operatively coupled to the event simulation module and which is configured to verify that all events of the family of events have been simulated prior to enabling simulation of a subsequent event which is not included in the family of events, wherein simulation of the subsequent event is enabled if simulation of all events of the family of events has been verified.

18. The computer system of claim 17 wherein the event simulation module comprises:

an event structure constructor which is configured to construct a first event structure which represents a first event; and an event structure dispatcher which is operatively coupled to the event structure constructor and which is configured to send the first event structure to the resource manager for processing.

19. The computer system of claim 17 wherein the computer process further comprises:

a simulation status module which is configured to record, in the memory, a state which indicates that simulation of the family of events is in progress;

wherein the family event simulation status verification module is further configured to compare the recorded state with data indicating that simulation of the family of events is in progress.

20. The computer system of claim 17 wherein the computer process further comprises:

an event synchronization module which is configured to ensure that simulation of a prior one of the family of events is completed and which comprises:

(1) a tag event structure constructor which is configured to construct a tag event structure, processing of which by the resource manager returns the tag event structure to the computer process;

(2) a tag event structure dispatcher which is operatively coupled to the event structure constructor and which is configured to send the tag event structure to the resource manager for processing by the resource manager; and (3) a tag event structure receiver which is operatively coupled to the tag event structure dispatcher and which is configured to receive the tag event structure, wherein receipt of the tag event structure by the tag event structure receiver indicates that the tag event struture has been processed by the resource manager.

21. A computer program product comprising:

a computer usable medium having computable readable code embodied therein for determining that processing of one or more event structures which have been sent to a resource manager for processing is completed, wherein the processing by the resource manager includes managing the flow of event structures for receipt by a computer process, the computer readable code comprising:

a construction module which is configured to construct a tag event structure, processing of which by the resource manager returns the tag event structure to the computer process, which includes the construction modules the tag event structure having an identifier identifying the tag event structure;

a dispatch module, which is operatively coupled to the construction module and which is configured to send the tag event structure to the resource manager for processing after the one or more event structures have been sent to the resource manager for processing by the resource manager; and an event filter which is operatively coupled to the dispatch module and which is configured to receive and identify the tag event structure, wherein receipt of the tag event structure indicates that the tag event structure has been processed by the resource manager and the tag event structure is identified by the identifier, and the event filter is further configured to determine that processing of the one or more event structures which have been sent to the resource manager for processing is completed when the tag event structure is received and identified;

whereby the determination of the completion of the processing of the one or more event stuctures may be used to delay sending of a subsequent event structure to the resource manager until after the processing of the one or more event structures hat been completed.

22. A system for distributing code (i) which is stored on a computer-readable medium, (ii) which is executable by a computer, and (iii) which includes at least one module, each of which in turn is configured to carry out at least one function to be executed by the computer, the system comprising:

an event simulation module which is configured to simulate a family of two or more events, wherein simulation of the family of events includes sending each event of the family of events to a resource manager for processing, and wherein processing by the resource manager includes managing the flow of event structures for receipt by one or more processes; and a family event simulation status verification module which is operatively coupled to the event simulation module and which is configured to verify that all events of the family of events have been simulated prior to enabling simulation of a subsequent event which is not included in the family of events, wherein simulation of the subsequent event is enabled if simulation of all events of the family events has been verified.

23. The system of claim 22 wherein the event simulation module comprises:

an event structure constructor which is configured to construct a first event structure which represents a first event of the family of events; and an event structure dispatcher which is operatively coupled to the event structure constructor and which is configured to send the first event structure to the resource manager for processing.

24. The system of claim 22 further comprising:

a simulation status module which is configured to record, in a memory of a computer, a state which indicates that simulation of the family of events is in progress;

wherein the family event simulation status verification module is further configured to compare the recorded state with data indicating that simulation of the family of events is in progress.

25. The system of claim 22 further comprising.

an event synchronization module which is configured to ensure that simulation of a prior one of the family of events is completed and which comprises:

(1) a tag event structure constructor which is configured to construct a tag event structure, processing of which by the resource manager returns the tag event structure;

(2) a tag event structure dispatcher which is operatively coupled to the tag event structure constructor and which is configured to send the tag event structure to the resource manager for processing the resource manager; and (3) a tag event structure receiver which is operatively coupled to the tag event structure dispatcher and which is configured to receive the tag event structure, wherein receipt of the tag event structure by the tag event structure receiver indicates that the tag event structure has been processed by the resource manager.

26. A method for determining that an event structure has been processed by a resource manager, the method comprising:

sending the event structure to the resource manager;

an event creator constructing a tag event structure, wherein the function of the tag event structure is to be returned to the event creator when the tag event structure is processed by the resource manager, the tag event structure having an identifier identifying the tag event structure;

sending the tag event structure to the resource manager after the first event structure has been sent to the resource manager for processing wherein the processing by the resource manager includes managing the low of event structure for receipt by one or more processes;

receiving the tag event structure, wherein the receipt of the tag event structure indicates that the tag event structure has been processed by the resource manager;

identifying the tag event structure by identifying the identifier, determining that the event structure has been processed by the resource manager through the return and identification of the tag event structure; and sending a subsequent event structure to the resource manager after receipt of the tag event structure, whereby the sending of the subsequent event structure is delayed until it is determined that processing of the one or more event structures by the resource manager has been completed.

27. A method for simulating a family of events, the family of events including two or more events, the method comprising:

simulating a selected event of the family of events, which includes, an event creator constructing a selected event structure which represents the selected event, and sending the selected event structure to a resource manager for processing, wherein the processing by the resource, manager includes managing the flow of event structures for receipt by one or more processes;

verifying that the selected event has been simulated before simulating a subsequent event; and simulating the subsequent event of the family of events if simulation of the selected event has been verified.

28. The method of claim 27, wherein verifying that the selected event has been simulated includes:

the event creator constructing a tag event structure, wherein the function of the tag event structure is to be returned the event creator when the tag event structure is processed by the resource manager; and sending the tag event structure to the resource manager for processing after the selected event structure has been sent to the resource manager for processing.

29. The method of claim 28, wherein verifying that the selected event has been simulated further includes:

the event creator receiving the tag event structure, wherein the receipt of the tag event structure indicates that the tag event structure has been processed by the resource manager.

30. The method of claim 29, wherein verifying that the selected event has been simulated further includes:

determining that the selected event structure has been processed by the resource manager through the return of the tag event structure.

31. The method of claim 28, wherein the tag event structure has an identifier identifying the tag event structure, and verifying that the selected event has been simulated further includes:

identifying the tag event structure by identifying the identifier; and determining that the selected event structure has been processed by the resource manager through the return and identification of the tag event structure.

32. The method of claim 27, wherein the selected event of the family of events is a last event of the family of events.

33. The method of claim 27, wherein the subsequent event is a next event of the family of events following the selected event.

34. The method of claim 27, wherein the subsequent event is not included in the family of events.

35. A computer program product comprising:

a computer usable medium having computable readable code embodied therein simulating a family of two or more events wherein simulation of the family of events includes sending each event of the family of two or more events to a resource manager for processing, and wherein processing by the resource manager includes managing the flow of event structures for receipt by one or more processes, the computer readable code comprising:

an event simulation module which is configured to simulate a selected event of the family of events, wherein simulation of the selected event includes sending the selected event to the resource manager for processing the event simulation module including, an event structure constructor which is configured to construct a selected event structure which represents the selected event, the selected event structure being suitable for processing by the resource manager, and an event structure dispatcher which is operatively coupled to the event structure constructor and further configured to send the selected event structure to the resource manager for processing; and a family event simulation status verification module which is operatively coupled to the event simulation module and which is configured to verify that the selected event of the family of events has been simulated prior to enabling simulation of a subsequent event structure;

whereby the determination of the completion of the processing of the family of event may be used to delay sending of a subsequent event structure to the resource manager until after the processing of the family evict has been completed.

36. The computer program product claimed in claim 35, further comprising:

an event synchronization module operatively coupled to the family event simulation status verification module, wherein the event synchronization module is configured to ensure that simulation of the selected event of the family of events is completed before enabling simulation of the subsequent event and which comprises:
(1) a tag event structure constructor which is configured to construct a tag event structure processing of which by the resource manage returns the tag event structure, the tag event structure having an identifier which identifies the tag event structure;
(2) a tag event structure dispatcher which is operatively coupled to the tag event structure constructor and which is configured to send the tag event structure to the resource manager for processing by the resource manager; and
(3) a tag event structure receiver which is operatively coupled to the tag structure dispatcher and which is configured to receive the tag event structure, wherein receipt of the tag event structure by the tag event structure receiver indicates that the tag event structure has been processed by the resource managers the tag event structure receiver further configured to identify the tag event structure by the identifier.

37. An apparatus comprising:
a construction module which is configured to construct a tag event structure, processing of which by a resource manager returns the tag event structure to a computer process which includes the construction modules the tag event structure having an identifier, whereby the tag event structure is identified by the identifier;
a dispatch module, which is operatively coupled to the construction module and which is configured to send the tag event structure to the resource manager for processing after an event structure has been sent to the resource manager for processing by the resource manager; and
an event filter which is operatively coupled to the dispatch module and which is configured to receive and identify the tag event Structure by the identifier, wherein receipt of the tag event structure indicates that the tag event structure has been processed by the resource manager, and the event filter is further configured to determine that processing of the event structure which has been sent to the resource manager for processing is completed when the tag event structure is received and identified;
whereby the determination of the completion of they processing of the tag event structure may be used to delay sending of a subsequent event structure to the resource manager until after the processing of the tag event structure has been completed.

38. An apparatus comprising
an event simulation module which is configured to simulate a selected event of a family of two or more events, the event simulation module including,
an event structure constructor which is configured to construct a selected event structure which represents the selected event, and
an event structure dispatcher which is operatively coupled to the event structure constructor and which is configured to send the selected event structure to a resource manager for processing, wherein the processing by the resource manager includes managing the flow of event structures for receipt by one or more processes; and
a family event simulation status verification module which is operatively coupled to the event simulation module and which is configured to verify that all events of the family of events have been simulated prior to enabling simulation of a subsequent event structure;
whereby the determination of the completion of the processing of the family of events may be used to delay sending of the subsequent event structure to the resource manager until after the simulation of all events of the family of events has been completed.

39. The apparatus of claim 38 further comprising:
an event synchronization module configured to ensure that simulation of the selected event of the family of events is completed before enabling simulation of the subsequent event the event synchronization module comprising:
(1) a tag event structure constructor which is configured to construct a tag event structure, processing of which by the resource manager returns the tag event structure, the tag event structure having an identifier identifying the tag event structure;
(2) a tag event structure dispatcher which is operatively coupled to the tag event structure constructor and which is configured to send the tag event structure to the resource manager for processing by the resource manager; and
(3) a tag event structure receiver which is operatively coupled to the tag event structure dispatcher and which is configured to receive and identify the tag event structure, wherein receipt of the tag event structure indicates that the tag event structure has been processed by the resource manager, the tag structure receiver further configured to identify the tag event structure by the identifier.

* * * * *